United States Patent [19]
Benson

[11] Patent Number: 5,819,272
[45] Date of Patent: Oct. 6, 1998

[54] RECORD TRACKING IN DATABASE REPLICATION

[75] Inventor: Max L. Benson, Redmond, Wash.

[73] Assignee: Microsoft Corporation, Redmond, Wash.

[21] Appl. No.: 678,978

[22] Filed: Jul. 12, 1996

[51] Int. Cl.$^6$ ................................................ G06F 17/30
[52] U.S. Cl. ................................................ 707/8; 707/10
[58] Field of Search .................................. 707/10, 201, 8, 707/202, 203; 395/182.04, 703

[56] References Cited

U.S. PATENT DOCUMENTS

| | | | |
|---|---|---|---|
| 4,432,057 | 2/1984 | Daniell et al. | 707/8 |
| 4,714,996 | 12/1987 | Gladney et al. | 707/203 |
| 5,218,699 | 6/1993 | Brandle et al. | 395/650 |
| 5,247,676 | 9/1993 | Ozur et al. | 395/650 |
| 5,261,094 | 11/1993 | Everson et al. | 707/201 |
| 5,283,856 | 2/1994 | Gross et al. | 395/51 |
| 5,434,994 | 7/1995 | Shaheen et al. | 707/201 |
| 5,530,855 | 6/1996 | Satoh et al. | 707/201 |
| 5,553,279 | 9/1996 | Goldring | 707/201 |
| 5,581,754 | 12/1996 | Terry et al. | 707/8 |
| 5,586,310 | 12/1996 | Sharman | 707/10 |
| 5,603,026 | 2/1997 | Demers et al. | 707/8 |
| 5,627,961 | 5/1997 | Sharman | 395/182.04 |
| 5,640,561 | 6/1997 | Satoh et al. | 707/202 |
| 5,649,195 | 7/1997 | Scott et al. | 707/201 |
| 5,675,802 | 10/1997 | Allen et al. | 395/703 |

OTHER PUBLICATIONS

Tang et al, A Scheme for Maintaining Consistency and Availability of Replicated Files in a Patitioned Distributed System, IEEE, pp. 530–537, Feb. 1989.

Rusinkiewicz et al, Transaction Management in a Distributed Database Systemfor Local Area Network, IEEE, pp. 177–182, Oct. 1988.

Brahmadathan et al, Read Only Transactions in Partitioned Replicated D atabases, IEEE, pp. 522–529, Feb. 1989.

Hac et al, Algorithm for File Replication in a Distributed System, IEEE, pp. 206–214, Oct. 1988.

Singhal, A Fully Distributed Approach to Concurrency Control in Replicated Database Systems, pp. 353–360, Oct. 1988.

Shirley, John and Rosenberry, Ward, "Microsoft RPC Programming Guide", O'Reilly & Associates, 1995.

Kramer, Matt, "Baranof's MailCheck 2.6 Delivers Improved Tools", PC Week, Sep. 11, 1995, Ziff–Davis Publishing Company 1995.

Frenkel, Gary, "cc:Mail View Keeps an Eye on Your Messaging System", Network Computing, Jun. 1, 1995, CMP Publications, Inc., 1995.

*Primary Examiner*—Thomas G. Black
*Assistant Examiner*—Frantz Coby
*Attorney, Agent, or Firm*—Workman Nydegger Seeley

[57] ABSTRACT

In a one aspect, a technique for tracking the status of records in replicated databases. Sets of identifiers (e.g., record identifiers or change numbers) are stored by individual replicas, and in some cases conveyed between replicas. The sets comprise lists of intervals, with each interval being either a single number (in the case of the interval containing only one identifier) or a pair of numbers representing the low and high bounds of the interval. Stored as lists of intervals, the sets can usually be efficiently compressed for compact storage or transmission. The technique is particularly useful for tracking the status of message records in distributed messaging systems. It is also particularly useful in "push" replication schemes as the status information represented by the sets of identifiers can be replicated simply by each replica sending its set of identifiers to other replicas. In a second aspect, a technique for handling per user read/unread data in a distributed database such as a client/server messaging system, particularly server transparent distributed databases, in which the replica server accessed by a user can change transparently to the user. Copies of the per user read/unread data are stored on a first server (e.g., the user's home server on which the user's mailbox is stored in a messaging system) and on the replica server currently accessed by the user. Changes made to the replica copy to reflect records read by the user are written back to the copy stored on the first server.

51 Claims, 6 Drawing Sheets

RECORD TRACKING IN DATABASE REPLICATION

BACKGROUND OF THE INVENTION

The invention relates to record tracking in database replication.

In a distributed database in which replicas of the database are stored on different servers across a network, there is a need to track the status of records, and to convey the status of records between replicas during replication. For example, the fact that a record has been deleted or modified needs to be tracked, and that status conveyed to other replicas. Similarly, the fact that records have been read by particular users needs to be tracked.

A known technique for such tracking is to use what are sometimes called change numbers. Each server on which a tracked event occurs, e.g., the deletion or modification of a record, associates a change number with the record to track the event. For example, deleted records are tracked by keeping lists of tombstones, each consisting of a record identifier paired with a change number. Each replica keeps track of the highest change number it has received from other replicas, and during replication requests tombstones or modified records having change numbers greater than that highest change number.

My copending application, entitled "Replicating Deletion Information Using Sets of Deleted Record IDs", filed on the same date as this application (and hereby incorporated by reference), addresses the tracking of record deletion information.

Another reason for tracking record status in replicated databases is to keep track of whether records have been read by particular users. Distributed databases in which messages or documents are stored in public folders typically provide, on a per user basis, a read/unread bit for each message (the per user read/unread data). Client software uses these read/unread bits to indicate the "readiness" of a message when displaying a list of messages in the folder (e.g., by displaying read messages in normal font, and unread in bold font), providing a count of unread messages in the folder, or showing a filtered view of only unread messages. The read/unread bit for each message has a different value for every user of the folder, but must have the same value across all replicas of the folder (except for replication latency). In prior systems, the per user read/unread data has either been stored entirely at the client (e.g., Usenet, the Internet news groups system) or replicated between servers as part of the regular replication of the database (e.g., Lotus Notes).

SUMMARY OF THE INVENTION

In a one aspect, the invention provides an improved technique for tracking the status of records in replicated databases. Sets of identifiers (e.g., record identifiers or change numbers) are stored by individual replicas, and in some cases conveyed between replicas. Preferably, the sets comprise lists of intervals, with each interval being either a single number (in the case of the interval containing only one identifier) or a pair of numbers representing the low and high bounds of the interval. Stored as lists of intervals, the sets can usually be efficiently compressed for compact storage or transmission (e.g., using the technique disclosed in my copending application, entitled, "Compressing Sets of Integers," filed on the same date as this application, and hereby incorporated by reference). The invention is particularly useful for tracking the status of message records in distributed messaging systems. It is also particularly useful in "push" replication schemes as the status information represented by the sets of identifiers can be replicated simply by each replica sending its set of identifiers to other replicas.

In another aspect, the invention provides an improved technique for handling per user read/unread data in a distributed database such as a client/server messaging system, particularly server transparent distributed databases, in which the replica server accessed by a user can change transparently to the user.

Copies of the per user read/unread data are stored on a first server (e.g., the user's home server on which the user's mailbox is stored in a messaging system) and on the replica server currently accessed by the user. Changes made to the replica copy to reflect records read by the user are written back to the copy stored on the first server.

Preferred implementations may include one or more of the following features.

The replica accessed by the user may change over time transparently to the user, and the identity of the second server on which the replica is stored may be redetermined when the user accesses the database.

A field indicating the identity of the last server from which the master copy of the per user read/unread data was updated may be examined, and the data copied to the second server if the last server is different from the currently accessed server.

The replica copy of the per user read/unread data may be updated on the first server when the user finishes accessing the database.

The replica copy of the per user read/unread data may be updated on the second server at about the same time as updates are made to the master copy on the first server.

The per user read/unread data comprises the current change numbers of records that have been read by the user. Preferably, the change numbers are stored without the record identifiers. The set of change numbers may also include superseded change numbers (i.e., change numbers formerly assigned to records), change numbers of deleted records, numbers in the change number range which will never be assigned as change numbers of records in the database (e.g., because the numbers were assigned for other purposes).

Because this set of change numbers tends to have few "holes", it can be represented as a small number of intervals, and can be compactly stored using the technique disclosed in my copending application entitled, "Compressing Sets of Integers," filed on even date herewith.

Replication conflicts can be handled by creating replication conflict records containing a copy of each conflicting record and the change number of each record. Each of the change numbers of such a record may be included in the set of change numbers.

Determining whether a particular record has been read by a user may be accomplished by determining whether the change number of the record is included in the set of change numbers of the per user read/unread data.

Determining the number of records unread by a particular user may be accomplished by comparing the change numbers making up the per user read/unread data to a set of change numbers for all records in the database to determine the number of records read, and subtracting that number from the total number of records in the database.

The invention may be implemented in hardware or software, or a combination of both. Preferably, the technique is implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other features and advantages of the invention will become apparent from the following description of preferred embodiments, including the drawings, and from the claims.

DESCRIPTION OF THE PREFERRED EMBODIMENTS

Figure 1:
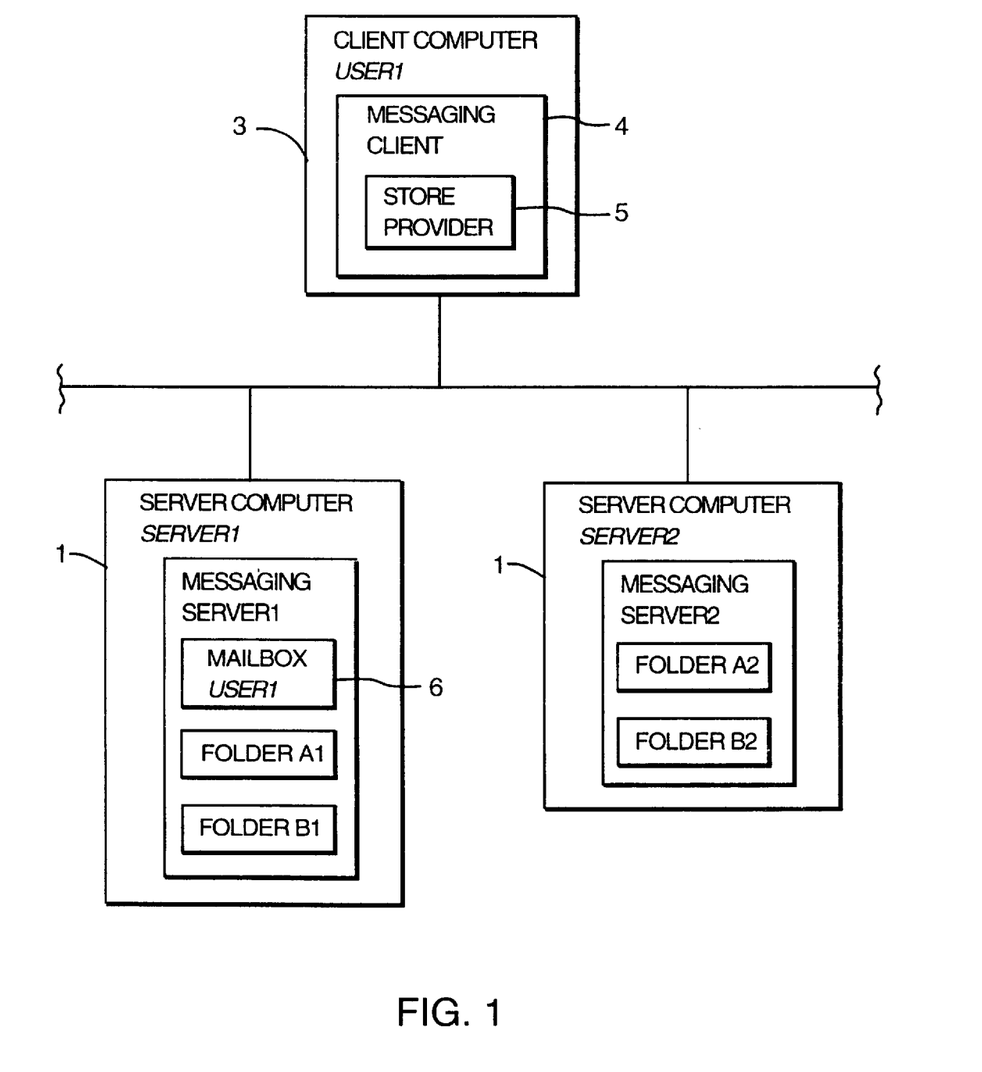
FIG. 1 is a block diagram showing a system of networked computers on which a distributed client/server database is stored.

Shown in FIG. 1 is a simplified system of client and server computers connected by a network communication channel 10. Computers 1 and 2 function as servers for a client/server messaging system such as Microsoft (R) Exchange. Computer 3 functions as a client from which one user, USER1, communicates with the messaging system. The messaging client software 4 on computer 3 includes a store provider 5 that communicates with the messaging server on the user's home server (computer 2 in FIG. 1), and in particular with USER1's mailbox 6 stored on that server.

Messages stored in the messaging system are organized in folders, such as the user's inbox, private folders, and public folders. The public folders contain messages readable by a plurality of users. To facilitate communication between clients and the various folders of the messaging system, replicas of the folders are stored on different servers. In the simplified example of FIG. 1, replicas of two public folders are shown. Public folders A and B have replicas A1, B1 on computer 1, and replicas A2, B2 on computer 2. Of course, as is well known by those skilled in the art, many more folders of all types, and many other program and data components of the client/server messaging system would also be stored on the servers, as well as on the clients.

Figure 2:
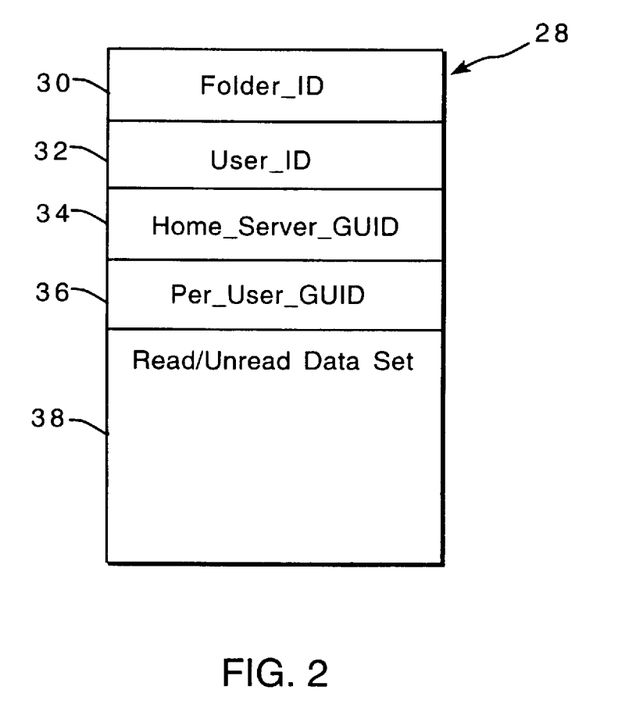
FIG. 2 shows the data making up a per user read/unread data record.

A read/unread data record 28 is kept for each user with access rights to a public folder. The read/unread data record indicates, for each message in the folder, whether the message has been read by the user. A master copy of the read/unread data record 28 is stored in the user's mailbox for each public folder to which the user has access rights. FIG. 2 shows the principal data fields making up the read/unread data record. Folder_ID 30 identifies the public folder to which the data pertains. User_ID 32 identifies the user to which the data pertains. Per_User_GUID 36 is the globally unique identifier of the replica server to which the master copy was last copied. The read/unread data set 38 (identified below as CNs_Marked_Read_Or_Deleted) specifies which messages have been read by the user; it is described in detail below. For a given folder, there is a different read/unread data record 28 for every user with access rights to the folder. These read/unread data records can be voluminous, particularly when there are many users with access rights to the folder. To reduce hard disk storage and bandwidth requirements, the read/unread data records are not replicated in the same manner as the underlying messages of the folder. While all of the messages in a folder are copied to replicas of the folder, the read/unread data records are only copied to those replicas actually accessed by a particular user.

Figure 3:
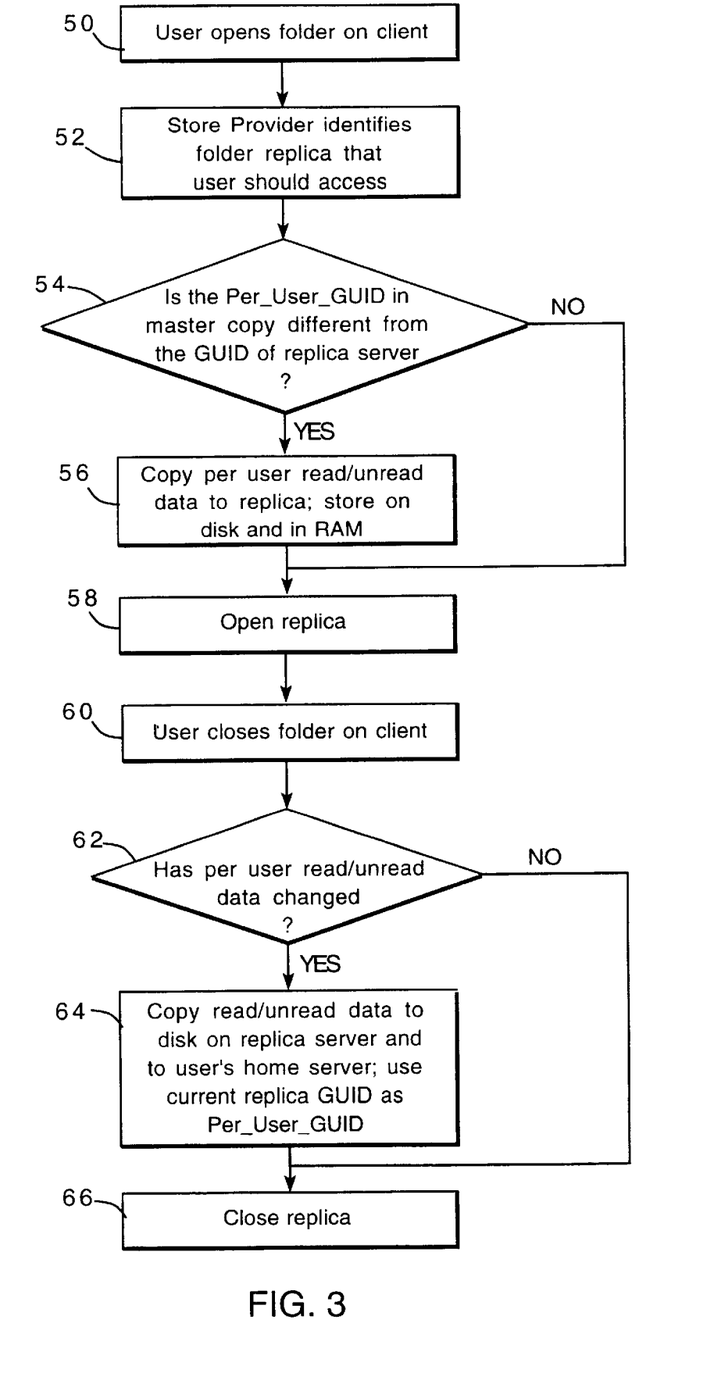
FIG. 3 is a flow chart showing the technique used for propagating per user read/unread data between the master and replica copies.

FIG. 3 shows the technique used for propagating the per user read/unread data between the master copy kept on the user's home server and a replica server being accessed by the user. When a user opens a folder on the client (step 50), the store provider 5 on the client communicates with the user's home server to determine which replica of the requested folder is assigned to the user (step 52). The assigned replica can vary over time, transparent to the user. E.g., if folder A (FIG. 1) were being opened, the administrator might have assigned replica A1, and then reassign the user to replica A2.

In the process of opening communication with the assigned replica, the Per_User_GUID stored in the master copy is compared to the GUID of the server on which the assigned replica is stored (step 54). If the Per_User_GUID is the same, it means that this is the same replica of this folder that the user accessed previously, and no action is required before the replica is opened (step 58). If the Per_User_GUID is different, it means that a replica different from the last one has been accessed, and the per user read/unread data record 28 is copied to the replica, where it is stored on disk and in RAM.

When the user closes the folder on the client software (step 60), the software determines whether the per user read/unread data set (CNs_Marked_Read_Or_Deleted) has changed (step 62). If it has changed, the read/unread data record 28 is written back to disk on the replica and on the user's home server (64), with the replica's GUID written over the existing Per_User_GUID. If the read/unread data set has not changed, no write back occurs. After steps 62, 64 are completed, the replica is closed for the user (step 66). The same steps (62, 64) of writing back changes in the read/unread data set can optionally also be performed periodically during idle periods.

To understand the composition of the read/unread data sets, it is necessary to understand change numbers (CNs).

Messages are identified both by a message identifier unique to the message and a change number (CN) that identifies each new version of the message. Each time a message is changed it is assigned a new change number, which typically is chosen from an ascending series of numbers unique to the server on which the number is assigned. In the preferred embodiment, a change number consists of a globally unique ID (GUID) of the server on which the change was made, plus a unique sequence number assigned by the server.

It is change numbers that make up the read/unread data sets, as when a message is changed it becomes unread for all users. In a simpler embodiment, simply the change numbers of messages that have been read could be stored in the read/unread data set. But in the preferred embodiment, additional change numbers are stored in order to make the set of numbers more amenable to compression. For each user, and each folder, the read/unread data set consists of: (1) change numbers of messages that have been read by that user in that folder; (2) change numbers of messages deleted from the folder; (3) change numbers of superseded versions of messages; (4) numbers in the change number range which will never be assigned as change numbers of messages in this folder (e.g., because the sequence numbers were used by the server for other purposes). This set of numbers, which is referred to as CNs—Marked—Read—Or—Deleted, tends to have relatively few "holes" in it, and thus can be represented as a small number of intervals. For instance, if all of the messages in a folder have been read by a user, or at least the user is diligent about reading messages in the order of creation, then in most cases the read/unread data set will turn out to be a single interval.

Because the read/unread data set can be represented as a small number of intervals (some of which may be "singletons", i.e., an "interval" consisting of a single number) it is possible to represent the set very efficiently, using the compression technique disclosed in my copending application entitled "Compressing Sets of Integers", filed on even data herewith.

Most messages have only a single change number associated with them, but in the case of a replication conflict, a message can have a plurality of change numbers. Replication conflicts occur when a message is changed on a plurality of servers at roughly the same time, between replications (lists of predecessor change numbers associated with each message are used to determine if a conflict has occurred). If a conflict has occurred, the message is stored as a replication conflict message, in which each changed version of the message is embedded as an attachment, and the change number of each attachment is stored instead of the usual single change number. For example, if a message started out with change number 1—1 (i.e., GUID=1, sequence number=1), and at roughly the same time, between replication intervals, the message was changed on different servers, which assigned it change numbers 1–5 and 2–3, a replication conflict message would be created with both change numbers associated with it. All replicas would independently recognize the conflict, and build identical replication conflict messages.

Figure 4:
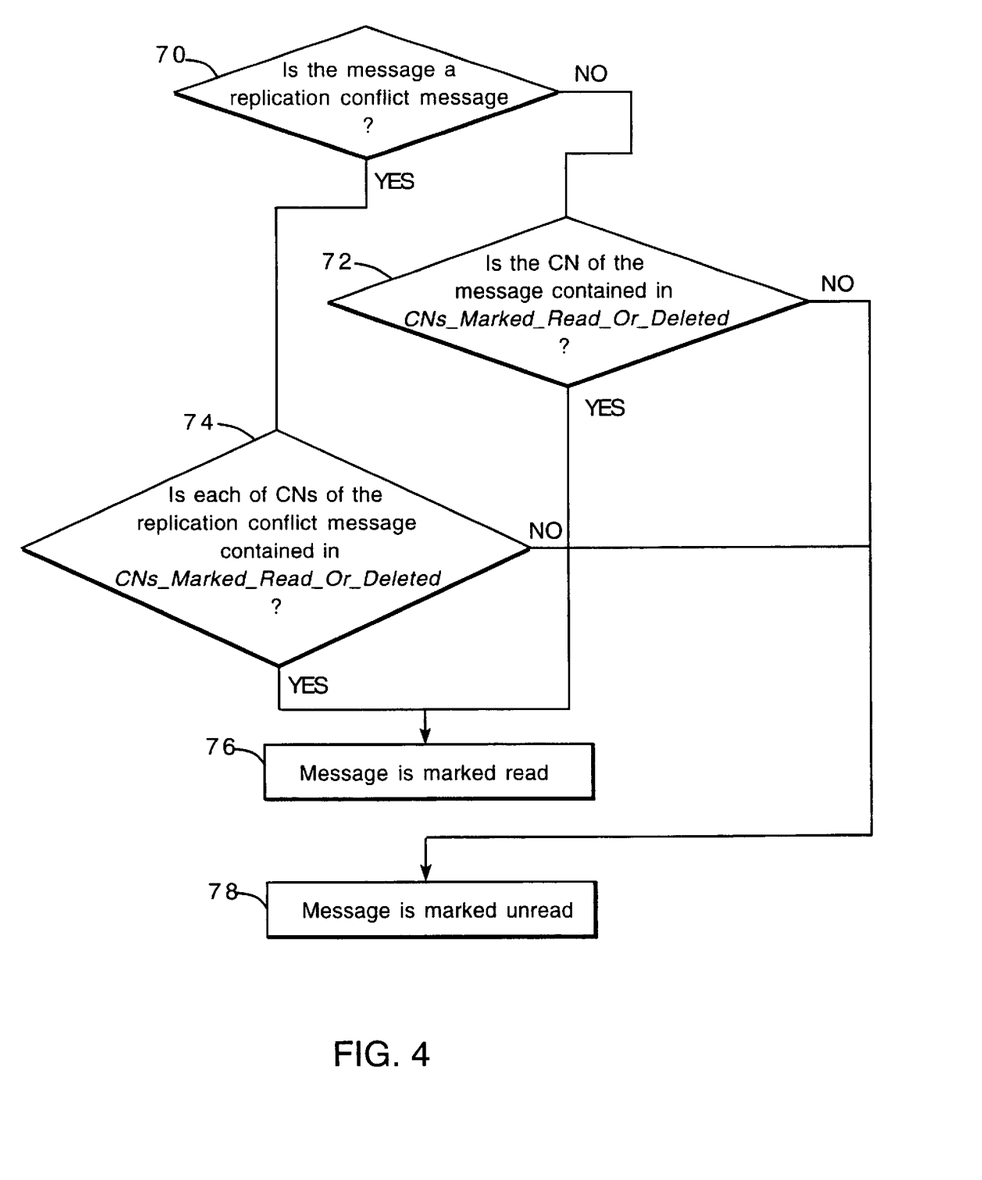
FIG. 4 is a flow chart showing the technique used to determine whether a message should be marked read or unread.

FIG. 4 shows the technique used to determine whether a message should be marked read or unread. First, it is determined whether the message is a replication conflict message (step 70). If it is, then each of the CNs of the replication conflict message is compared to the read/unread data set, CNs_Marked_Read_Or_Deleted (step 74), and the message is marked read (step 76) only if all of the CNs are contained in the set. Otherwise, the message is marked unread (step 78). If the message is not a replication conflict message, then its singular CN is compared to CNs_Marked_Read_Or_Deleted (step 72), and the message is marked read (step 76) if the CN is contained in the set. Otherwise it is marked unread (step 78).

Figure 5:
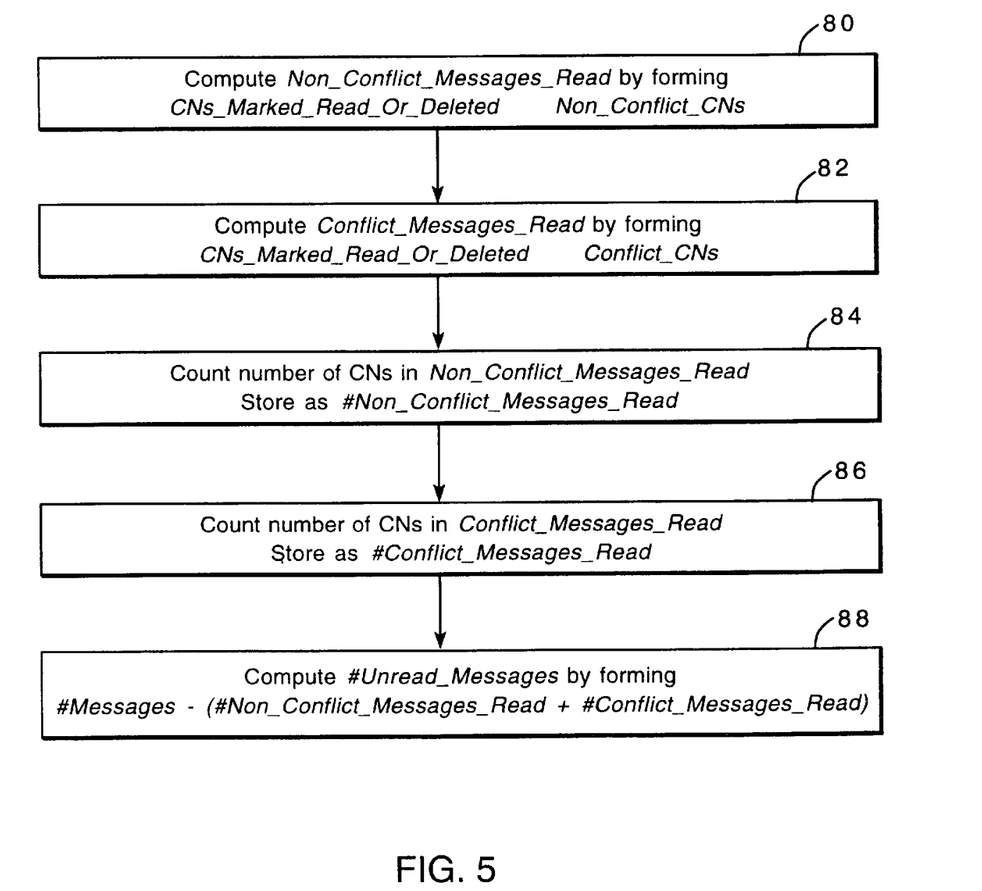
FIG. 5 is a flow chart showing the technique used to determine the count of unread messages in a folder.

FIG. 5 shows the technique used to determine the count of unread messages in a folder. It would be possible, of course, to scan through all of the messages in a folder, determine whether each was read or unread, and produce the count in that fashion. But a more efficient process is available using CNs_Marked_Read_Or_Deleted and three additional properties that are kept current on a per folder (not per user) basis. These three properties are: (1) #Messages (the number of messages currently in the folder); (2) Non_Conflict_CNs (the set of change numbers of non-conflict messages currently in the folder); and Conflict_CNs (this is a set of lists of change numbers, one list for each replication conflict message in the folder). As shown in FIG. 5, Non_Conflict_Messages_Read is formed from the intersection of CNs_Marked_Read_Or_Deleted with Non_Conflict_CNS (step 80). Also, Conflict_Messages_Read is formed from the intersection of CNs_Marked_Read_Or_Deleted with Conflict_CNs (step 82). This intersection is not a conventional set intersection, in view of Conflict_CNs being a set of lists. The rule followed to form the intersection is that an element of Conflict_CNs is in the intersection only if all change numbers in the CN list for that element are in CNs_Marked_Read_Or_Deleted. Next, the number of elements in each of the two new sets is determined (steps 84, 85). Then, the number of unread messages, #Unread_Messages, is computed (step 88) by reducing the total number of messages in the folder, #messages, by the sum of the number of non-conflict messages read, #Non_Conflict_Messages_Read, and the number of conflict messages read, #Conflict_Messages_Read.

Figure 6:
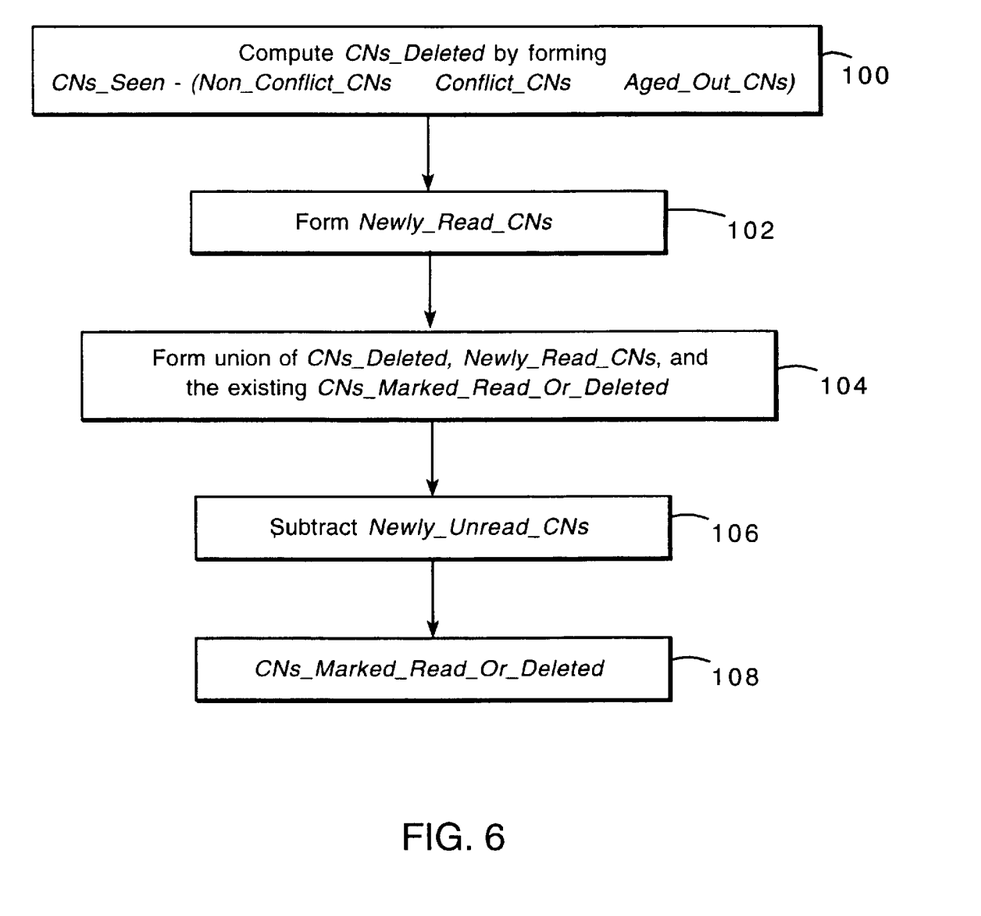
FIG. 6 shows the technique used to update the per user read/unread data set.

FIG. 6 shows the technique used to update the read/unread data set, CNs_Marked_Read_Or_Deleted. Updates are not done every time there is a change to a folder, but only when the contents of a folder are written back to disk. This assures that CNs_Marked_Read_Or_Deleted accurately reflects the read/unread state of the messages stored on the disk.

The update process begins by forming (step 100) a set which is called CNs_Deleted, but which actually contains more than just change numbers that have been deleted. Two additional sets, CNs_Seen and Aged_Out_CNs, are used in forming CNs_Deleted.

CNs_Seen is the set of change numbers for changes that have either been applied to the folder or will not ever be applied. In the case of a single replica, this would be an interval running from 1 to the largest change number issued that the replica has seen. With multiple replicas, it is typical for this set to consist of a set of disjoint intervals, one for each server. On infrequent occasions, there will be holes in the change number intervals received from other servers because of temporarily lost replication packets.

Aged_Out_CNs is the set of change numbers corresponding to messages that have exceeded a maximum permissible age, and been removed from a folder. The age at which this takes place can vary from replica to replica. Since change numbers are issued sequentially on each server, this set consists of a union of intervals, one interval for each server. Because message aging is variable from replica to replica, it is not possible to remove messages simply by deleting them, for deletions are automatically replicated across all replicas.

CNs_Deleted is formed (step 100) by subtracting from CNs_Seen the union of Aged_Out_CNs and the two sets earlier described, Non_Conflict_CNs and Conflict_CNs. In forming the union with Conflict_CNs each of the CNs on the sublists of CNs (from each of the replication conflict messages) is merged into the union.

Newly_Read_CNs is then formed (step 102) by populating the set with the change numbers of messages read since the last update. Change numbers for messages that had been read, but that were subsequently marked unread since the last update form a further set, Newly_Unread_CNs.

The new CNs_Marked_Read_Or_Deleted (108) is formed (step 104) as the union of CNs_Deleted, Newly_Read_CNs, and the existing CNs_Marked_Read_Or_Deleted, minus (step 106) Newly_Unread_CNs, the set of change numbers corresponding to messages newly marked unread.

Other embodiments are within the scope of the following claims. For example, various equivalent sequences of set operations (e.g., unions, intersections, subtractions) can be performed in place of the operations described above. Various forms of replication could be employed (e.g., "push" or "pull"). The read/unread data sets could store the identities of unread, rather than read, messages, and instead of constituting sets of change numbers, they could be sets of record identifiers. The invention can be applied to tracking various other aspects of the status of records (e.g., deletion or modification of records), and it can be applied in various other types of databases other than messaging systems.

What is claimed is:

1. In a distributed database in which a plurality of replicas are stored on different servers connected to a network, and in which users access the replicas from a plurality of clients connected to the network, a computer implemented method of storing per user read/unread data indicating which of a plurality of records in the database have been read by particular users, the method comprising:

storing a first copy of the per user read/unread data on a first server;

determining the identity of a second server on which an accessed replica is stored;

copying the first copy of the per user read/unread data for that user from the first server to the second server to create a replica copy of the data;

updating the replica copy of the per user read/unread data on the second server to reflect records read by the user on the replica stored on the second server, and updating the first copy of the per user read/unread data with changes made to the replica copy of the per user read/unread data.

2. The method of claim 1, wherein the first copy of the per user read/unread data is a master copy associated with a particular user.

3. The method of claim 2, wherein the per user read/unread data comprises numbers representing records read by the user associated with the data.

4. The method of claim 2, wherein the replica accessed by the user may change over time transparently to the user, and the identity of the second server on which the replica is stored is redetermined when the user accesses the database.

5. The method of claim 4, wherein the replica copy of the per user read/unread data is updated on the first server when the user finishes accessing the database.

6. The method of claim 4, wherein the replica copy of the per user read/unread data is updated on the second server at about the same time as updates are made to the master copy on the first server.

7. The method of claim 1, wherein the database is a messaging system and the database records are messages.

8. The method of claim 4 wherein the master copy of the per user read/unread data is kept on the same server as the messaging system mailbox of the user corresponding to the data.

9. The method of claim 1, wherein the per user read/unread data for a user is included essentially only in replicas accessed by that user.

10. The method of claim 4, wherein the step of copying the master copy of the per user read/unread data comprises:

examining a field indicating the identity of the last server from which the master copy of the per user read/unread data was updated, and copying the per user read/unread data to the second server if the last server is a different server from the second server.

11. The method of claim 1, wherein the per user read/unread data comprises a set of change numbers currently assigned to records read by the user.

12. The method of claim 11 wherein the per user read/unread data comprises change numbers without associated record identifiers.

13. The method of claim 12 wherein the set of change numbers further comprises superseded change numbers.

14. The method of claim 13 wherein the set of change numbers further comprises change numbers of deleted records.

15. The method of claim 14 wherein the set of change numbers further comprises change numbers assigned for purposes other than identifying records changed in the database.

16. The method of claim 15 wherein the set of change numbers is stored as a list of intervals.

17. The method of claim 11 wherein for replication conflict records a plurality of change numbers, each corresponding to a record included in the replication conflict record, are included in the set of change numbers.

18. The method of claim 11 further comprising determining whether a particular record has been read by a user by determining whether the change number of the record is included in the set of change numbers of the per user read/unread data.

19. The method of claim 11 further comprising determining the number of records unread by a particular user by comparing the change numbers making up the per user read/unread data to a set of change numbers for all records in the database to determine the number of records read, and subtracting that number from the total number of records in the database.

20. A computer program, residing on a computer readable medium, for storing per user read/unread data for the records of a distributed database in which a plurality of replicas are stored on different servers connected to a network, and in which users access the replicas from a plurality of clients connected to the network, the computer program comprising instructions for:

storing a first copy of the per user read/unread data on a first server;

determining the identity of a second server on which the accessed replica is stored;

copying the first copy of the per user read/unread data for that user from the first server to the second server to create a replica copy of the data;

updating the replica copy of the per user read/unread data on the second server to reflect records read by the user on the replica stored on the second server; and updating the first copy of the per user read/unread data with changes made to the replica copy of the per user read/unread data.

21. The method of claim 20, wherein the first copy of the per user read/unread data is a master copy associated with a particular user.

22. The method of claim 21, wherein the per user read/unread data comprises numbers representing records read by the user associated with the data.

23. The method of claim 21, wherein the replica accessed by the user may change over time transparently to the user, and the identity of the second server on which the replica is stored is redetermined when the user accesses the database.

24. The method of claim 23, wherein the master copy of the per user read/unread data is updated on the first server when the user finishes accessing the database.

25. The method of claim 23, wherein the replica copy of the per user read/unread data is updated on the second server at about the same time as updates are made to the master copy on the first server.

26. The method of claim 20, wherein the database is a messaging system and the database records are messages.

27. The method of claim 26 wherein the master copy of the per user read/unread data is kept on the same server as the messaging system mailbox of the user corresponding to the data.

28. The method of claim 20, wherein the per user read/unread data for a user is included essentially only in replicas accessed by that user.

29. The method of claim 23, wherein the step of copying the master copy of the per user read/unread data comprises:
examining a field indicating the identity of the last server from which the master copy of the per user read/unread data was updated, and
copying the per user read/unread data to the second server if the last server is a different server from the second server.

30. The method of claim 20, wherein the per user read/unread data comprises a set of change numbers currently assigned to records read by the user.

31. The method of claim 30 wherein the per user read/unread data comprises change numbers without associated record identifiers.

32. The method of claim 31 wherein the set of change numbers further comprises superseded change numbers.

33. The method of claim 32 wherein the set of change numbers further comprises change numbers of deleted records.

34. The method of claim 33 wherein the set of change numbers further comprises change numbers assigned for purposes other than identifying records changed in the database.

35. The method of claim 34 wherein the set of change numbers is stored as a list of intervals.

36. The method of claim 30 wherein for replication conflict records a plurality of change numbers, each corresponding to a record included in the replication conflict record, are included in the set of change numbers.

37. The method of claim 30 further comprising determining whether a particular record has been read by a user by determining whether the change number of the record is included in the set of change numbers of the per user read/unread data.

38. The method of claim 30 further comprising determining the number of records unread by a particular user by comparing the change numbers making up the per user read/unread data to a set of change numbers for all records in the database to determine the number of records read, and subtracting that number from the total number of records in the database.

39. A method for tracking the status of records in a distributed database in which a plurality of replicas are stored on different servers connected to a network, a method of storing a set of identifiers, the method comprising:
using an interval to represent a series of identifiers in the set;
describing the interval with a low and a high bound,
the low bound being a number representative of the smallest number in the series of identifiers; and
the high bound being a number representative of the largest number in the series of identifiers.

40. The method of claim 39 wherein the set includes singletons as well as intervals, a singleton being the case in which the set of identifiers consists of a single number.

41. The method of claim 39 wherein the set contains a plurality of intervals, each described by a low and a high bound.

42. The method of claim 39 wherein the set is conveyed from one replica to another replica to update a corresponding set stored on the other replica.

43. The method of claim 42 wherein the identifiers are change numbers.

44. The method of claim 42 in which the distributed database is a messaging system, and the records are messages.

45. A computer program, resident on a computer readable medium, for a distributed database in which a plurality of replicas are stored on different servers connected to a network, the computer program comprising instructions for:
storing sets of identifiers to identify selected records of the database;
using an interval to represent a series of identifiers in the set;
describing the interval with a low and a high bound,
the low bound being a number representative of the smallest number in the series of identifiers; and
the high bound being a number representative of the largest number in the series of identifiers.

46. The computer program of claim 45 wherein the set includes singletons as well as intervals, a singleton being the case in which the set of identifiers consists of a single number.

47. The computer program of claim 45 wherein the set contains a plurality of intervals, each described by a low and a high bound.

48. The computer program of claim 45 wherein the set is conveyed from one replica to another replica to update a corresponding set stored on the other replica.

49. The computer program of claim 45 wherein the identifiers are change numbers.

50. The computer program of claim 48 wherein the identifiers are record identifiers.

51. The method of claim 48 in which the distributed database is a messaging system, and the records are messages.

* * * * *

UNITED STATES PATENT AND TRADEMARK OFFICE
CERTIFICATE OF CORRECTION

PATENT NO. : 5,819,272
DATED : October 6, 1998
INVENTOR(S) : Max L. Benson

It is certified that error appears in the above-identified patent and that said Letters Patent is hereby corrected as shown below:

Cover Page, Abstract ln. 1: after "In" and before "one" delete [a]

Col. 1, ln. 53: after "In" and before "one" delete [a]

Col. 6, ln. 19: before "(step 80)" change "CNS" to --CNs--

Signed and Sealed this

Twenty-sixth Day of September, 2000

Attest:

Q. TODD DICKINSON

*Attesting Officer*    *Director of Patents and Trademarks*